No. 608,912. Patented Aug. 9, 1898.
M. M. RENN.
VEHICLE WHEEL.
(Application filed Dec. 9, 1897.)

(No Model.) 2 Sheets—Sheet 1.

WITNESSES: J. A. Brophy  C. R. Ferguson

INVENTOR M. M. Renn.
BY
ATTORNEYS.

No. 608,912. Patented Aug. 9, 1898.
M. M. RENN.
VEHICLE WHEEL.
(Application filed Dec. 9, 1897.)
(No Model.) 2 Sheets—Sheet 2.
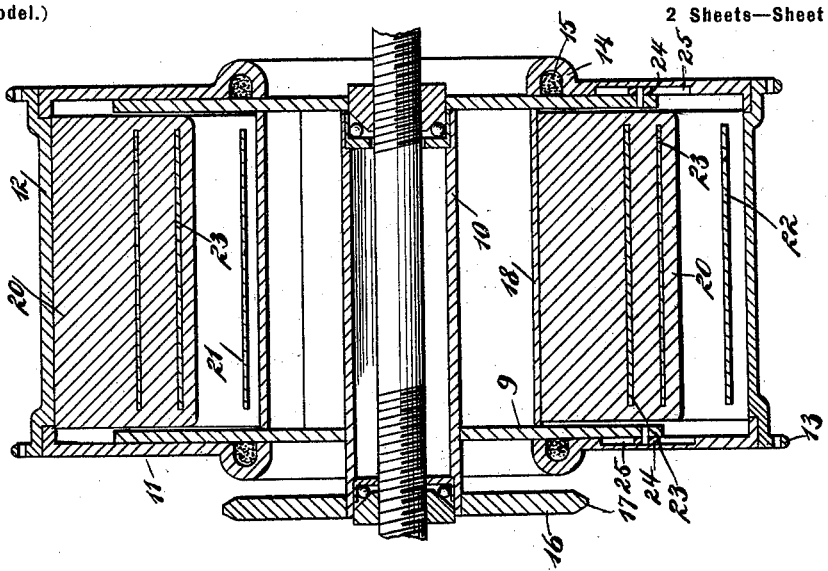
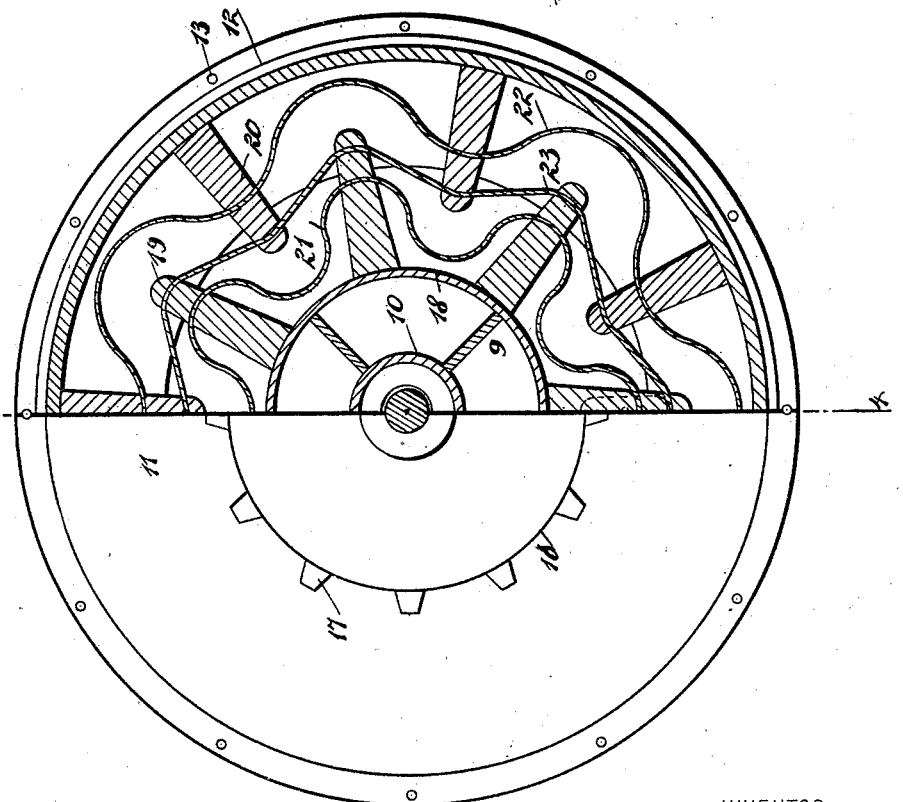
WITNESSES:
INVENTOR
M. M. Renn.
BY
ATTORNEYS.

UNITED STATES PATENT OFFICE.

MATHEW M. RENN, OF LOUISVILLE, KENTUCKY.

VEHICLE-WHEEL.

SPECIFICATION forming part of Letters Patent No. 608,912, dated August 9, 1898.

Application filed December 9, 1897. Serial No. 661,256. (No model.)

*To all whom it may concern:*

Be it known that I, MATHEW M. RENN, of Louisville, in the county of Jefferson and State of Kentucky, have invented a new and Improved Vehicle-Wheel, of which the following is a full, clear, and exact description.

This invention relates to improvements in vehicle-wheels, particularly bicycle-wheels, but obviously adapted for use with other vehicles.

The object is to provide a wheel of comparatively simple construction which shall have all the spring or yielding qualities of a pneumatic-tired wheel, but will be free from the disadvantages of a pneumatic tire, such as damage and annoyance from punctures.

I will describe a vehicle-wheel embodying my invention and then point out the novel features in the appended claims.

Reference is to be had to the accompanying drawings, forming a part of this specification, in which similar characters of reference indicate corresponding parts in all the views.

Figure 1:
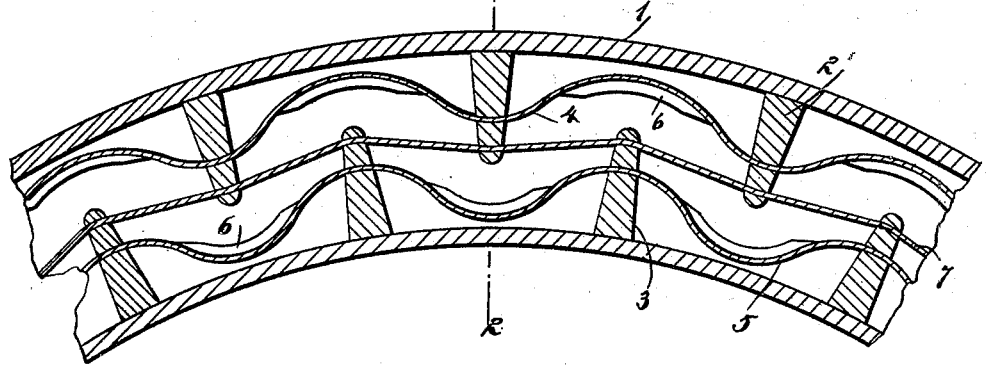
Figure 2:
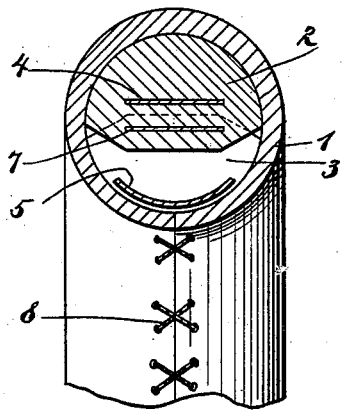

Figure 1 is a longitudinal section of a portion of vehicle-wheel embodying my invention. Fig. 2 is a section on the line 2 2 of Fig. 1. Fig. 3 is a partial section and partial side elevation of another portion of the wheel, and Fig. 4 is a section through the line 4 4 of Fig. 3.

In Figs. 1 and 2 I have shown the tire portion of the wheel, which comprises a casing 1 of yielding material—such, for instance, as rubber. Arranged within this casing are an outer series of supporting-blocks 2 and an inner series of supporting-blocks 3. These supporting-blocks are of yielding material, such as rubber, and are designed to be loosely placed in the casing. The outer series of blocks project toward the axis of the wheel, while the inner series project in an outward direction. Extended entirely around the casing and through openings in the outer supports 2 is a spring-plate 4, and extended entirely around the casing and through the inner supports 3 is a spring-plate 5. These spring-plates are longitudinally sinuate, and between the supports the plates may have laterally-extended wings 6, conforming to or adapted to bear against the inner sides of the casing, and thus prevent undue lateral flexure.

It will be seen that the supports of one series alternate with the supports of the other series and the several supports of both series are held in proper relation to each other or from displacement by a tie-band 7, which will also be of spring material. This tie-band extends through openings near the ends of all the supports. The spring-plates 4 and 5 and the tie-band 7 may have their ends secured together in any desired manner. By this arrangement it is obvious that under pressure the spring-plates and the band will yield together and distribute the pressure evenly.

The construction just described, it is obvious, is designed for the wheel-tire, and in forming it the two series of supports may be connected to their respective spring-plates, and then the two series are to be connected by the tie-band 7. After this the casing 1 may be turned over the same and laced on the inner side, as at 8.

The object in making the spring-plate sinuate is to secure a greater length and consequent resiliency than can be found in a straight band-spring.

In Figs. 3 and 4 I have shown my invention as applied to the hub portion of a wheel. In this example the case comprises a section 9, surrounding the shaft-hanger 10 and fixed with relation thereto. The other section 11 of the casing is mounted to move on the section 9—that is, it is designed to yield under pressure toward the axis of the wheel. This outer section of the casing consists of side plates 11, made in the form of a ring, and a rim-plate 12, secured to the outer periphery thereof and provided with openings or perforations 13, which receive the inner ends of the wire spokes. The inner periphery of each side plate is provided with an inner annular channel 14, in which a packing material 15 may be placed. This packing material is designed to hold a lubricant and also by engaging against the casing-section 9 to prevent the entrance of dirt or dust. To allow the section 11 to yield axially with relation to the section 9, but to rotate therewith, I provide the section 9 with blocks 24, movable in channels 25 in the section 11. The blocks may have a rotary motion.

Within the section 9 of the casing is a ring 18, and engaging with this ring is a series of supporting-blocks 19, consisting of flexible material—such, for instance, as rubber—and bearing upon the inner surface of the band 12 of the movable section is the outer series of supporting-blocks 20, also of yielding material. These supporting-blocks are like the supporting-blocks first described in connection with Figs. 1 and 2 and as in the first example the supports of one series alternate with the supports of another series. Extended through the several supports of the inner series is a sinuate spring-plate 21, and extended through the outer series of supports is a sinuate spring-plate 22, and extended through all the supports of both series is a binding-band 23, the object of which is the same as that of the binding-band 7. The ends of the spring-plates and the binding-band may be secured together in any desired manner. Obviously by connecting the several supporting-blocks and the plates and band they may be placed in the casing after removing one side thereof.

It is obvious that a vehicle-wheel embodying my invention will be quite light, simple, and cheap, and, further, there are no parts to get out of order or to rattle.

Having thus described my invention, I claim as new and desire to secure by Letters Patent—

1. A vehicle-wheel, comprising a casing, two series of yielding supports in the casing, the supports of one series alternating with the supports of the other series and extending in the opposite direction, a longitudinally-sinuate spring-plate extended through each series of supports, and a tie-band extended through all the supports of each series, substantially as specified.

2. A vehicle-wheel, comprising a yielding casing, two series of supports of yielding material in the casing, the supports of one series alternating with the supports of the other series and extending in opposite directions, a longitudinally-sinuate spring-plate extended through the supports of each series, and a spring tie-band extended through all the supports of both series, substantially as specified.

3. A vehicle-wheel, comprising a yielding casing, two series of supporting-blocks removably placed in said casing, the supporting-blocks of one series alternating with the supporting-blocks of the other series and extending in the opposite direction, a longitudinally-sinuate spring-plate extended through one series of supports, and a spring-band extending through all the supports, substantially as specified.

4. In a vehicle-wheel, a tubular casing of yielding material, two series of supporting-blocks loosely arranged therein, the blocks of one series alternating with the blocks of the other series and extending in the opposite direction, a longitudinally-sinuate plate extended through one series of supports and having lateral wings between supports, a longitudinally-sinuate spring-plate extended through the other series of supports and having lateral wings between supports, and a tie-band extended through all the supports, substantially as specified.

MATHEW M. RENN.

Witnesses:
GEO. GUTIG,
EDW. QUINO.